(12) United States Patent
Sun et al.

(10) Patent No.: US 7,894,728 B1
(45) Date of Patent: Feb. 22, 2011

(54) SAMPLE TIMING CONTROL IN AN OPTICAL RECEIVER

(75) Inventors: Han Sun, Nepean (CA); Chandra Bontu, Nepean (CA); Kim B. Roberts, Nepean (CA); John Sitch, Ottawa (CA); John Wolczanski, Carp (CA)

(73) Assignee: Ciena Corporation, Linthicum, MD (US)

( * ) Notice: Subject to any disclaimer, the term of this patent is extended or adjusted under 35 U.S.C. 154(b) by 771 days.

(21) Appl. No.: 11/550,042

(22) Filed: Oct. 17, 2006

Related U.S. Application Data (60) Provisional application No. 60/728,751, filed on Oct. 21, 2005.

(51) Int. Cl.
*H04B 10/06* (2006.01)
(52) U.S. Cl. .................................. 398/208; 398/211
(58) Field of Classification Search .............. 398/208, 398/211
See application file for complete search history.

(56) References Cited

U.S. PATENT DOCUMENTS

| 4,506,388 | A | 3/1985 | Monerie et al. |
|---|---|---|---|
| 4,720,827 | A | 1/1988 | Kanaji |
| 4,723,316 | A | 2/1988 | Glance |
| 4,965,858 | A | 10/1990 | Naito et al. |
| 5,457,563 | A | 10/1995 | Van Deventer |
| 5,473,463 | A | 12/1995 | Van Deventer |
| 5,995,512 | A | 11/1999 | Pogue |
| 6,473,222 | B2 | 10/2002 | Hait et al. |
| 6,607,311 | B1 | 8/2003 | Fishman et al. |
| 6,735,397 | B2 * | 5/2004 | Herrity .................. 398/158 |
| 6,782,211 | B1 | 8/2004 | Core |
| 6,934,307 | B2 * | 8/2005 | DeCusatis et al. .......... 370/518 |
| 7,065,103 | B1 * | 6/2006 | Gagnon et al. .............. 370/474 |
| 2002/0012152 | A1 | 1/2002 | Agazzi et al. |
| 2002/0186435 | A1 | 12/2002 | Shpantzer et al. |
| 2003/0063285 | A1 | 4/2003 | Pering et al. |
| 2003/0123884 | A1 | 7/2003 | Willner et al. |
| 2003/0175034 | A1 | 9/2003 | Noe |
| 2004/0114939 | A1 | 6/2004 | Taylor |
| 2005/0196176 | A1 | 9/2005 | Sun et al. |

(Continued)

FOREIGN PATENT DOCUMENTS

EP 1453239 A1 9/2004

(Continued)

OTHER PUBLICATIONS

Richard A. Linke, et al., "High-Capacity Coherent Lightwave Systems", Journal of Lightwave Technology, vol. 6, No. 11, Nov. 1988, pp. 1750-1769.

(Continued)

*Primary Examiner*—Nathan M Curs
(74) *Attorney, Agent, or Firm*—Kent Daniels; Blake, Cassels & Graydon LLP (57) ABSTRACT

A method of compensating phase error between parallel digital signals of a received optical signal, in a coherent optical receiver. A phase differential between the digital signals is determined. A digital skew is imposed between the digital signals, an amount of skew imposed being an integer number of sample periods calculated to most nearly compensate the phase differential. The skewed digital signals are then digitally processed, in the frequency domain, to compensate a residual portion of the phase differential.

7 Claims, 8 Drawing Sheets

U.S. PATENT DOCUMENTS

2005/0206419 A1* 9/2005 Kizer et al. .................. 327/158

FOREIGN PATENT DOCUMENTS

| GB | 2214381 A | 8/1989 |
|---|---|---|
| WO | WO 00/60776 A1 | 10/2000 |
| WO | WO 02/27994 A1 | 4/2002 |

OTHER PUBLICATIONS

Chul-Ho Shin, et al., "Heterodyne Optical Phase-Locked Loop by Confocal Fabry-Perot Cavity Coupled AlGaAs Laser", IEEE Photonoics Technology Letters, vol. 2, No. 4, Apr. 1990, pp. 297-300.

D.-S. Ly-Gagnon, et al., "Coherent Detection of Optical Quadrature Phase-Shift Keying Signals with Carrier Phase Estimation", Journal of Lightwave Technology, vol. 24, No. 1, Jan. 2006, pp. 12-21.

Frowin Derr, "Coherent Optical QPSK Intradyne System: Concept and Digital Receiver Realization", Journal of Lightwave Technology, vol. 10, No. 9, Sep. 1992, pp. 1290-1296.

D.-S. Ly-Gagnon, et al., "Unrepeatered optical transmission of 20 Gbit/s quadrature phase-shift keying signals over 210 km using homodyne phase-diversity receiver and digital signal processing", Electronics Letters, vol. 41, No. 4, Feb. 17, 2005, pp. 1-2.

Y. Cai, et al., "On Performance of Coherent Phase-Shift-Keying Modulation in 40 Gb/s Long-Haul Optical Fiber Transmission Systems", OFC, Mar. 2006, pp. 1-3.

Matthias Seimetz, "Performance of Coherent Optical Square-16-QAM-Systems based on IQ-Transmitters and Homodyne Receivers with Digital Phase Estimation", OFC, Mar. 2006, pp. 1-10.

U. Koc, et al., Digital Coherent Quadature Phase-Shift-Keying (QPSK), OFC, Mar. 2006, pp. 1-3.

Satoshi Tsukamoto, et al., "Coherent Demodulation of Optical 8-Phase Shift-Keying Signals Using Homodyne Detection and Digital Signal Processing", OFC, Mar. 2006, pp. 1-3.

Kazuro Kikuchi, "Coherent Detection of Phase-Shift Keying Signals Using Digital Carrier-Phase Estimation", OFC, Mar. 2006, pp. 1-3.

B. Spinnler et al., "Chromatic Dispersion Tolerance of Coherent Optical Communications Systems With Electrical Equalization", OFC, Mar. 2006, pp. 1-3.

R.I. Killey, et al., "Electronic dispersion compensation by signal predistortion", OFC, Mar. 2006, pp. 1-3.

Satoshi Tsukamoto, et al., "Unrepeated 20-Gbit/s QPSK Tansmission over 200-km Standard Single-Mode Fiber Using Homodyne Detection and Digital Signal Processing for Dispersion Compensation", OFC, Mar. 2006, pp. 1-3.

S. Calabro, et al., "An electrical polarization-state controller and demultiplexer for polarization multiplexed optical signals", ECOC-IOOC, Sep. 2003, pp. 1-2.

Reinhold Noe, "Phase Noise-Tolerant Synchronous QPSK/BPSK Baseband-Type Intradyne Receiver Concept With Feedforward Carrier Recovery", Journal of Lightwave Technology, vol. 23, No. 2, Feb. 2005, pp. 802-808.

Reinhold Noe, "PLL-Free Synchronous QPSK Polarization Multiplex/Diversity Receiver Concept With Digital I&Q Baseband Processing", IEEE Photonics Technology Letters, vol. 17, No. 4, Apr. 2005, pp. 887-889.

Ezra IP, et al., "Carrier Synchronization for 3-and 4-bit-per-Symbol Optical Transmission", Journal of Lightwave Technology, vol. 23, No. 12, Dec. 2005, pp. 4110-4124.

Yan Han, et al., "Coherent optical communication using polarization multiple-input-multiple-output", Optics Express, vol. 13, No. 19, Sep. 19, 2005, pp. 7527-7534.

L.E. Franks, "Carrier and Bit Synchronization in Data Communication-A Tutorial Review", IEEE Transactions on Communications, vol. COM-28, No. 8, Aug. 1980, pp. 1107-1121.

M. Cavallari, et al., Electronic Signal Processing for Differential Phase Modulation Formats, OFC 2004, pp. 1-3.

A. Farbert, et al., "Performance of a 10.7 Gb/s Receiver with Digital Equaliser using Maximum Likelihood Sequence Estimation", ECOC 2004, Proceedings PD-Th4.1.5, Stockholm, pp. 1-2.

Yusuke Ota, et al., "High-Speed, Burst-Mode, Packet-Capable Optical Receiver and Instantaneous Clock Recovery for Optical Bus Opearation", Journal of Lightwave Technology, vol. 12, No. 2, Feb. 1994, pp. 325-331.

Isaac Shpantzer, Ph.D., "A New Generation of Coherent ULH Fiber-Optic Communication", CeLight Inc., 40 G Workshop, OECC-2002 Conference, Yokohama, Japan, Jul. 8, 2002, pp. 1-14.

Isaac Shpantzer, Ph.D. et al., "Coherent Optical Fiber Communication Architecture, Modeling and Optimization", CeLight Inc., SCEE 2002 Conference, Eindhoven, The Netherlands, Jun. 25, 2002, pp. 1-39.

M. Tseytlin et al., "Digital, endless polarization control for polarization multiplexed fiber-optic communications", CeLight Inc., OFC 2003, Mar. 24, 2003, pp. 1-14.

International Search Report for applicant's related International PCT Application PCT/CA2006/001458, Sep. 5, 2006.

International Search Report for applicant's related International PCT Application PCT/CA2006/001459, Sep. 5, 2006.

International Search Report for applicant's related International PCT Application PCT/CA2006/001460, Sep. 5, 2006.

* cited by examiner

SAMPLE TIMING CONTROL IN AN OPTICAL RECEIVER

CROSS-REFERENCE TO RELATED APPLICATIONS

This application claims benefit under 35 U.S.C. 119(e) from United States Provisional Patent Application Ser. No. 60/728,751, entitled Automatic Gain Control, which was filed on Oct. 21, 2005.

TECHNICAL FIELD

The present invention relates to optical communications networks, and in particular to sample timing control in an optical receiver.

BACKGROUND OF THE INVENTION

Figure 1:
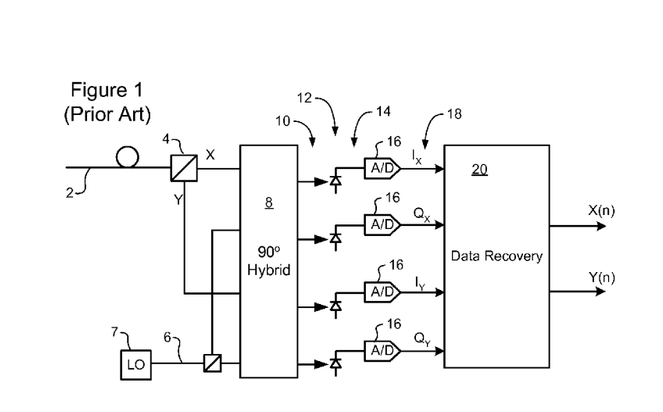
FIG. 1 is a block diagram schematically illustrating principal elements and operations of a coherent optical receiver known in the prior art.

FIG. 1 generally illustrates a coherent optical receiver known in the art. As may be seen in FIG. 1, an inbound optical signal is received through an optical link 2, split into orthogonal received polarizations by a Polarization Beam Splitter 4, and then mixed with a Local Oscillator (LO) signal 6 by a conventional 90° optical hybrid 8. It should be noted that the received polarizations appearing at the output of the beam Splitter 4 will not normally correspond with the transmittal polarizations of the optical signal. The composite optical signals 10 emerging from the optical hybrid 8 are supplied to respective photodetectors 12, which generate corresponding analog electrical signals 14. The photodetector signals 14 are sampled by respective Analog-to-Digital (A/D) converters 16 to yield raw digital signals 18 which, in the illustrated example, correspond to In-phase (I) and Quadrature (Q) components of each of the received polarizations. Although one photodetector 12 is shown for each A/D 16 in FIG. 1, in some known systems a pair of photodetectors 12 may be used. From the A/D converter 16 block, the digital signals 18 are supplied to a digital signal processing block 20 for digital data recovery.

As may be appreciated, the resolution of the A/D converters 16 is a balance between performance and cost. In many cases, the resolution of the A/D converters 16 is matched to the encoding scheme of the received optical signal. Thus, for example, one or two-bits resolution may be used for detecting bi-state signals, such as On-Off-Keying (OOK) or phase shift keying (PSK) encoded signals. Multi-level encoded signals may be detected using corresponding multi-bit A/D converters. In some cases, multi-bit A/D converters are also used to enable improved accuracy of downstream digital processing of the raw digital signals 18 by the data recovery block 20. The sample rate of the A/D converters 16 is normally selected to match the symbol rate of the received optical signal. However, over-sampling of the optical signal is also known. For example, in some systems, the sample rate may be selected to satisfy the Nyquist criterion for the highest anticipated symbol rate of the received optical signal. For the case of a 10Gbaud optical communications system, this represents a sample rate of about 20GHz.

Typically, the A/D converters 16 are controlled by a master clock signal (not shown in FIG. 1) which governs both the timing with which the received analog signal is measured and the timing with which a corresponding digital value is latched out of the A/D. Typically, the timing with which the analog signal is measured (which may be referred to as the sample timing) is adjusted so as to obtain a desired nominal sample phase relative a selected characteristic of the analog signal. For example, in the case of a received optical signal, it is frequently desirable to select the nominal sample phase to correspond with the center of the eye opening.

Typically, the precise timing with which digital values are latched out of the A/D converter is of less concern, except in cases in which two or more parallel A/D converters are used to sample a common analog signal. In such cases it us usually desired that the digital values of one digital signal have some desired phase relationship with the digital values of an adjacent digital signal. A common example of this is shown in the receiver of FIG. 1, in which a respective pair of parallel A/D converters are used to sample In-Phase and Quadrature components of each received polarization of the optical signal. For each polarization, the I and Q signal components are separated in the optical hybrid 8, so the sample timing required to obtain a desired nominal sample phase will be identical for both A/D converters. Similarly, it is desired that the corresponding digital values of both digital signal (that is, digital values derived from analog signal measurements taken at the same sample timing) are latched out of the respective A/D converters phase aligned, so that a common clock can be used to latch digital values out of both A/D converters and into downstream digital signal processing circuitry.

Optical signals received through conventional optical links are typically distorted by significant amounts of chromatic dispersion (CD) and polarization dependent impairments such as Polarization Mode Dispersion (PMD), polarization angle changes and polarization dependent loss (PDL). Chromatic dispersion (CD) on the order of 30,000 ps/nm, and polarization rotation transients at rates of $10^5$ Hz are commonly encountered.

Various methods and systems intended to address some of these limitations are known in the art. For example, a method of compensating polarization angle impairments are described in *PLL-Free Synchronous QPSK Polarization Multipex/Diversity Receiver Concept with Digital I&Q Baseband Processing,* R Noé, IEEE Photonics Technology Letters, Vol. 17, No. 4, April 2005.

Applicant's co-pending U.S. patent applications Nos. 11/294,613 filed Dec. 6, 2005 and entitled "Polarization Compensation In A Coherent Optical Receiver"; 11/315,342 filed Dec. 23, 2005 and entitled "Clock Recovery From An Optical Signal With Dispersion Impairments"; 11/315,345 filed Dec. 23, 2005 and entitled "Clock Recovery From An Optical Signal With Polarization Impairments"; 11/366,392 filed Mar. 2, 2006 and entitled "Carrier Recovery In A Coherent Optical Receiver"; and 11/423,822 filed Jun. 13, 2006 and entitled "Signal Acquisition In A Coherent Optical Receiver", the content of all of which are hereby incorporated herein by reference, describe methods and systems of reliable signal acquisition, clock recovery and polarization compensation in the presence of moderate-to-severe optical impairments of a received optical signal.

As may be appreciated, accurate compensation of polarization angle impairments in the manner proposed by Noé [supra], and in the systems described in the above-mentioned Applicant's co-pending applications, requires that the digital signals generated by the analog-to-digital (A/D) converters 16 accurately reproduce the amplitude and/or phase information of the original optical signal received through the optical link 2. However, in real-world network systems, design limitations and manufacturing variations in the optical hybrid 8 prevents perfect phase alignment between the optical signals 10 supplied to the photodetectors 12. Additional errors accumulate within the photodetectors 12 and the A/D converters 16, due to differing signal propagation delays, and different amplitude and phase responses of the involved components.

In a receiver utilizing multiple parallel A/D converters, these errors result in a difference between the desired nominal sample timing and the actual sample timing of each A/D converter. These sample timing differences mean that there will be corresponding differences in the actual sample phase of each A/D converter, relative the optical signal arriving at the polarization beam splitter 4. This sample phase differential may appear in the digital signals 18 as a combination of additive noise, distortion, polarization or phase degradations, and so impair the performance of the digital receiver.

Methods of achieving alignment between parallel digital signals output from parallel A/D converters are well known. However, these methods are focused on compensating differences in the timing of the digital values latched out of the parallel A/D converters. These methods do not address the issue of sample timing (and thus sample phase) errors embedded within each digital signal, which will be present even when corresponding values of each digital signal are properly aligned. At low symbol line rates, the embedded sample timing errors will be very much less than the symbol period, and thus their impact will be relatively minor. On the other hand, real-world optical communications network commonly operate at line rates of 10Gbaud or higher. At such high symbol rates, sample timing errors embedded within the digital signals can easily be several symbol periods.

It is well known how to use frame information to align the timing of bit streams, or demultiplexed bit streams, from parallel framed binary optical signals. This problem is quite distinct from the alignment of a plurality of multi-bit samples of one optical signal. Furthermore, as the multi-bit samples are generally not decoded binary symbols, but rather are often relatively unequalized samples of an analog signal, these framing methods are not applicable.

In addition to the above-described difficulties associated with sample timing errors between the parallel digital signals 18, timing errors can also impact each individual digital signal. For example, the systems described in the above-mentioned Applicant's co-pending applications utilize Nyquist sampling of the optical signal using multi-bit A/D converters. In a 10Gbaud optical communications system, this represents a sample rate of about 20GHz. An A/D converter resolution of at least 5 bits is preferred, in order to enable accurate compensation of impairments. This combination of high resolution and high sample rate is difficult to achieve in a single A/D converter, at reasonable cost.

Figure 2:
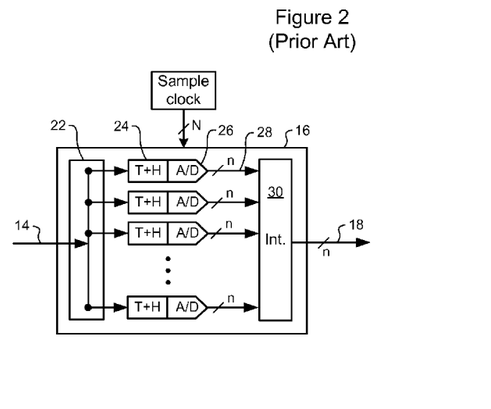
FIG. 2 is a block diagram schematically illustrating principal elements of a known high-speed Analog-to-Digital (A/D) converter composed of multiple parallel lower-speed sub-channel A/D converters.

A possible solution to this problem is to utilize several lower-speed A/D multi-bit converters in parallel, as shown in FIG. 2. Thus, a distribution network 22 supplies the photodetector current 14 to a respective track-and-hold circuit 24 of each one of N sub-channel A/D converters 26. Each sub-channel A/D converter 26 is a multi-bit A/D converter operating at 1/Nth of the aggregate sample rate to generate a respective sub-channel digital signal 28. By suitably setting the phase offset of the respective sample clock of each sub-channel A/D converter 26, the photodetector signal 14 will be sampled at evenly spaced intervals corresponding to the desired aggregate sample rate. An interleaver 30 operates in a known manner to combine the N sub-channel digital signals 28, in the correct sequence, to produce the desired digital signal 18. As will be appreciated, this arrangement relies on each sub-channel A/D converter 26 measuring the photodetector signal 14 with the correct sample timing within a very narrow tolerance. An error in the average sample phase of any one sub-channel A/D converter will appear as noise in the output digital signal 18. Since average sample phase is a function of manufacturing variations, temperature, and component aging, all of the sub-channel A/D converters 26 will normally exhibit at least some sample phase error, plus clock jitter. While the amount of degradation due to sub-channel sample timing error can be characterised mathematically, there is no simple means of compensating this degradation by processing the digital signal 18 downstream of the A/D converter 16.

In a controlled environment, such as a factory or laboratory, timing errors in an A/D converter can be measured with the use of a known electrical test signal. A single sine wave is commonly used for this purpose. This allows the errors that are present in the A/D converter at that time and temperature to be measured. However, especially when in operation in an installed "real-world" network, an optical receiver does not received a precise test signal. The received signal generally contains apparently random scrambled data, distorted by variable amounts of dispersion and polarization effects, and degraded by noise. These are not suitable A/D test signals for use with the known methods.

The above described issues of prior art A/D converters have been described in the context of a coherent optical receiver. However, it will be appreciated that these same issues will arise in any context in which it is desired to maintain accurate sample phase alignment between two or more parallel A/D converters.

Accordingly, cost-effective techniques for controlling sample phase alignment in an optical receiver remain highly desirable.

SUMMARY OF THE INVENTION

An object of the present invention is to provide cost-effective techniques for controlling sample phase alignment in an optical receiver.

Thus, an aspect of the present invention provides, in an optical receiver a method of compensating sample phase error between parallel multi-bit-digital signals of a received optical signal. A metric indicative of a sample phase differential between the digital signals is determined, and a parameter of the receiver adjusted so as to minimize a magnitude of the determined sample phase differential.

Another aspect of the present invention provides, a high-speed analog-to-digital (A/D) converter. The A/D converter includes a plurality of parallel time-interleaved sub-channel A/D converters, and a control loop for compensating a respective sample timing error of each sub-channel A/D converter.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENTS

The present invention provides techniques for controlling sample alignment in a coherent optical receiver of an optical communications network. Embodiments of the present invention are described below, by way of example only, with reference to FIGS. 3-9.

Figure 3:
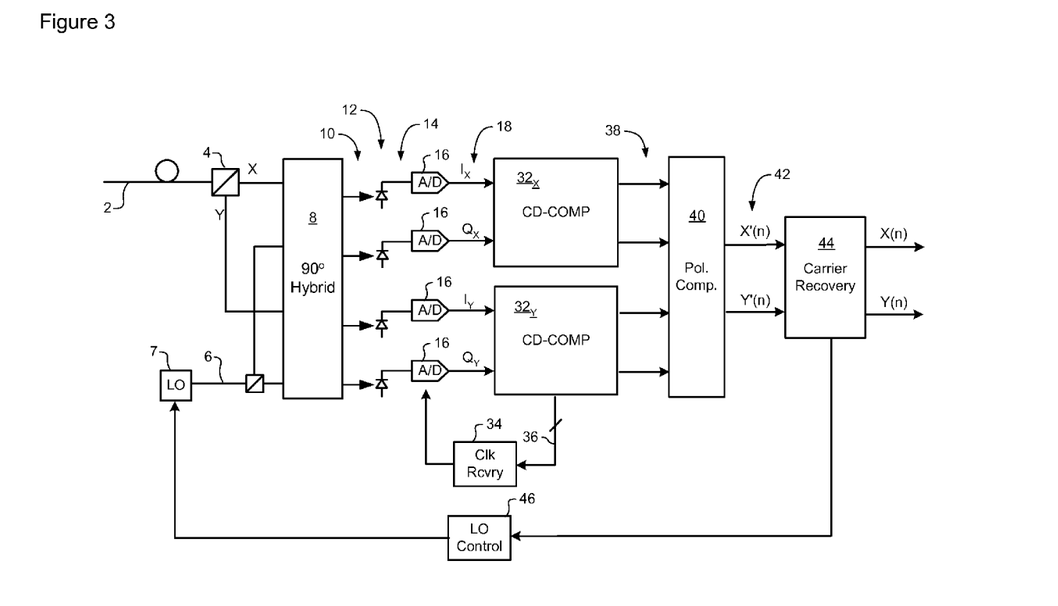
FIG. 3 is a block diagram schematically illustrating principal elements and operations of a coherent optical receiver in which methods in accordance with the present invention may be implemented.

FIG. 3 schematically illustrates a representative coherent optical receiver in which methods of the present invention may be implemented. As may be seen in FIG. 3, the analog "front-end" of the coherent optical receiver may be closely similar to that of the prior art receiver described above with reference to FIG. 1. Thus, an inbound optical signal is received through an optical link 2, split into orthogonal received polarizations by a Polarization Beam Splitter 4, and then mixed with a Local Oscillator (LO) signal 6 by a conventional 90° optical hybrid 8. The composite optical signals 10 emerging from the optical hybrid 8 are supplied to respective photodetectors 12, which generate corresponding analog electrical signals 14. The photodetector signals 14 are sampled by respective Analog-to-Digital (A/D) converters 16 to yield raw multi-bit digital signals 18 corresponding to In-phase (I) and Quadrature (Q) components of each of the received polarizations.

The resolution of the A/D converters 16 is a balance between performance and cost. It has been found that a resolution of n=5 or 6 bits provides satisfactory performance, at an acceptable cost. The sample rate of the A/D converters 16 is selected to satisfy the Nyquist criterion for the highest anticipated symbol rate of the received optical signal.

From the A/D converter 16 block, the respective n-bit I and Q signals 18 of each received polarization are supplied to a respective Dispersion compensator 32, which operates on the raw digital signal(s) 18 to at least partially compensate chromatic dispersion of the received optical signal.

A clock recovery block 34 may tap the dispersion compensators 32 to obtain an at least partially dispersion compensated digital signal 36, which is then used for recovering a clock signal, as described in Applicant's co-pending U.S. patent applications Nos. 11/315,342 and 11/315,345, both of which were filed Dec. 23, 2005.

The dispersion-compensated digital signals 38 appearing at the output of the dispersion compensators 32 are then supplied to a polarization compensator 40 which operates to de-convolve the transmitted I and Q signal components of each transmitted polarization from the dispersion-compensated digital signals 38. Various methods may be used to implement the polarization compensator 40, such as, for example, those described in Applicant's co-pending U.S. patent application No. 11/294,613 filed Dec. 6, 2005.

The distortion-compensated digital signals 42 appearing at the output of the polarization compensator 40 are then supplied to a carrier recovery block 44 for LO frequency control 46, symbol detection and data recovery, such as described in Applicant's co-pending U.S. patent application No. 11/366,392 filed Mar. 2, 2006.

Figure 4:
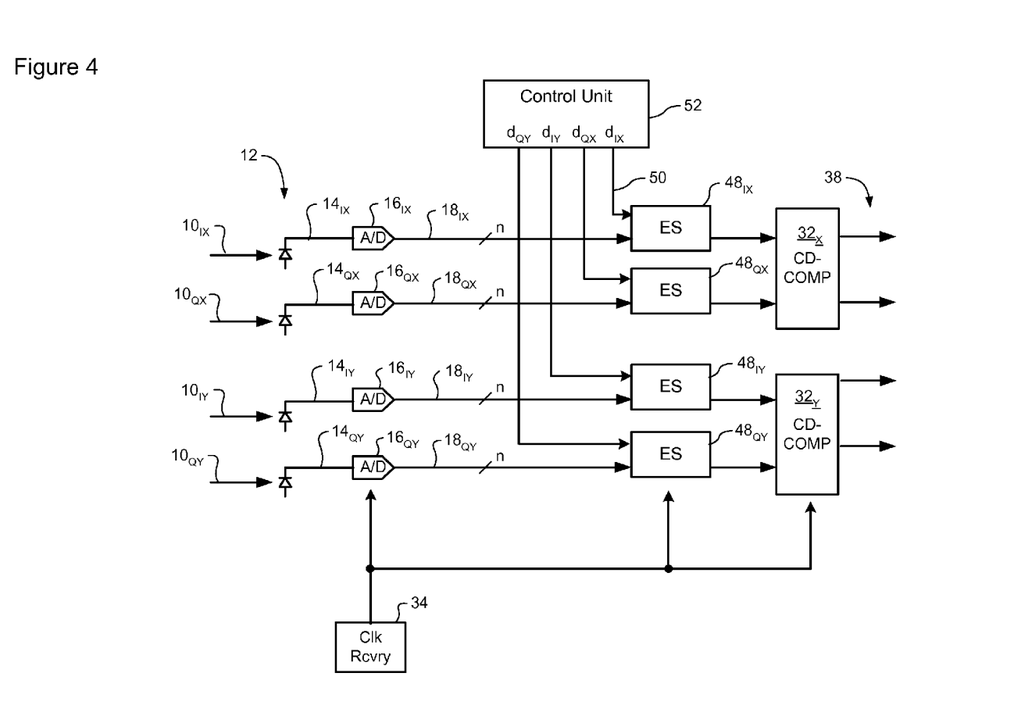
FIG. 4 is a block diagram schematically illustrating principal elements and operations of a phase error compensation system in accordance with a first embodiment of the present invention.

In one respect, the present invention provides systems and techniques for minimizing effects of sample phase and timing error in the dispersion compensated digital signals 38 at the output of the dispersion compensators 32. FIG. 4 schematically illustrates a simple embodiment, in which sample phase errors are reduced by means of a respective elastic store 48 in each signal path. The elastic stores 48 are used to digitally skew the raw n-bit digital signals 18, so as to achieve approximate sample phase alignment at the input to dispersion compensators 32. Preferably, the delay imposed by each elastic store 48 is governed by a control word 50, which may be generated by a control unit 52 of the receiver.

Figure 5:
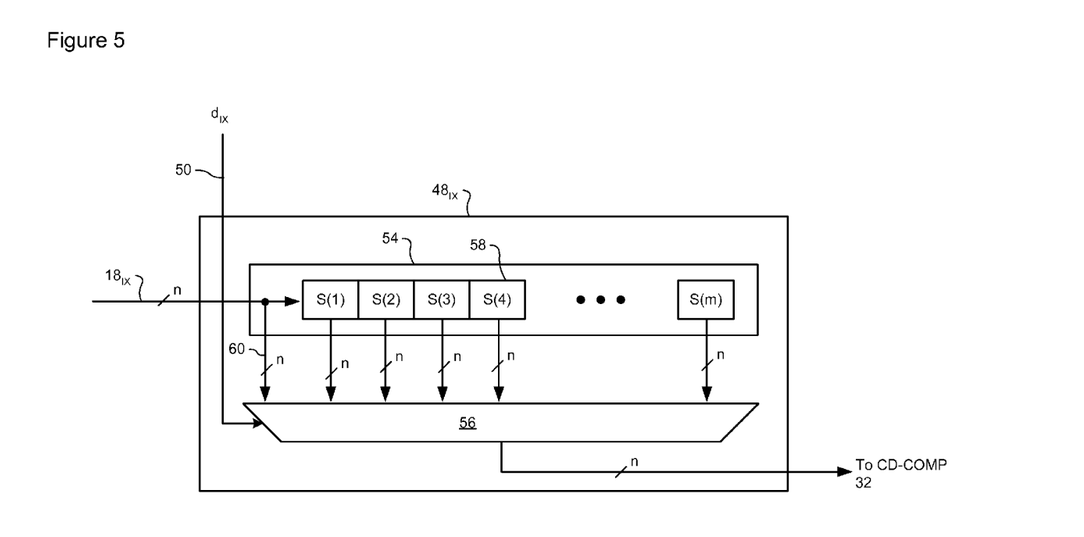
FIG. 5 is a block diagram schematically illustrating principal elements and operations of a representative elastic store of the embodiment of FIG. 4, in greater detail.

As may be appreciated, the elastic stores 48 may be implemented in a number of different ways. FIG. 5 illustrates an embodiment in which each elastic store 48 is implemented as an m-sample shift register 54 and a selector 56. In this embodiment, n-bit words of a respective raw digital signal 18 are latched through the shift register 54 at the full sample rate. The selector switch 56 operates to output n-bit words from a selected one of the cells 58 of the shift register 40, in accordance with the value of the control word 50. With this arrangement, the elastic store 48 can delay the n-bit digital signal 18 by an amount governed by the location of the "output" cell selected by the control word 50.

In the embodiment of FIG. 5, the selector switch 56 can also select a bypass-line 60 connected directly to the shift register input. This effectively by-passes the shift register 54, and enables the elastic store 48 to impose a zero-delay, if desired.

The maximum delay that can be imposed by each elastic store 48, is governed by the length (m words) of the shift register 54 and the size of the control word 50. For example, in an embodiment in which the control word 50 is a single byte value, the selector switch 56 can be set to 256 different states. In the embodiment of FIG. 5 this would enable the selector switch 56 to output n-bit words from any of 255 shift register cells 58, plus the bypass line 60. This implies a delay range of between zero and 255 sample periods, which, in a system with Nyquist sampling, corresponds with between 0 and 127½ symbol periods of the received optical signal.

With this arrangement, the propagation delay (or, alternatively, the propagation delay differences) accumulated between the beam splitter 4 and the output of each A/D converter 16 can be measured using known methods. For example, this step may be performed (e.g. as part of factory testing and calibration of the coherent optical receiver) by supplying an optical test signal having known characteristics to the beam splitter 4, and analysing the corresponding raw digital signals 18 generated by each of the A/D converters 16. Based on this information, the raw digital signal 18 having the largest measured propagation delay can be determined. For this digital signal, the additional delay imposed by its respective elastic store 48 can be set to zero. For each of the other digital signals, the respective elastic stores 48 can be set to impose delays calculated to most nearly offset the measured delay differential with the most severely delayed digital signal. This effectively introduces a digital skew between the parallel digital signals 18 (in increments of a single sample period) in order to minimize the sample phase differential between each digital signal 18. With Nyquist sampling, this does not result in any loss of information.

As may be appreciated, the delay differentials between the raw digital signals 18 are governed by the physical design of the hybrid 8, photodetectors 12 and A/D converters 16, and thus will not change greatly after manufacture of the receiver. Accordingly, it is not necessary to provide an adaptive control loop to update the control words 50 governing the delays imposed by each of the elastic stores 48. Instead, these control words 50 may be set once (using a non-volatile memory, for example) at the time of factory test, and then remain fixed thereafter.

Figures 6A, 6B:
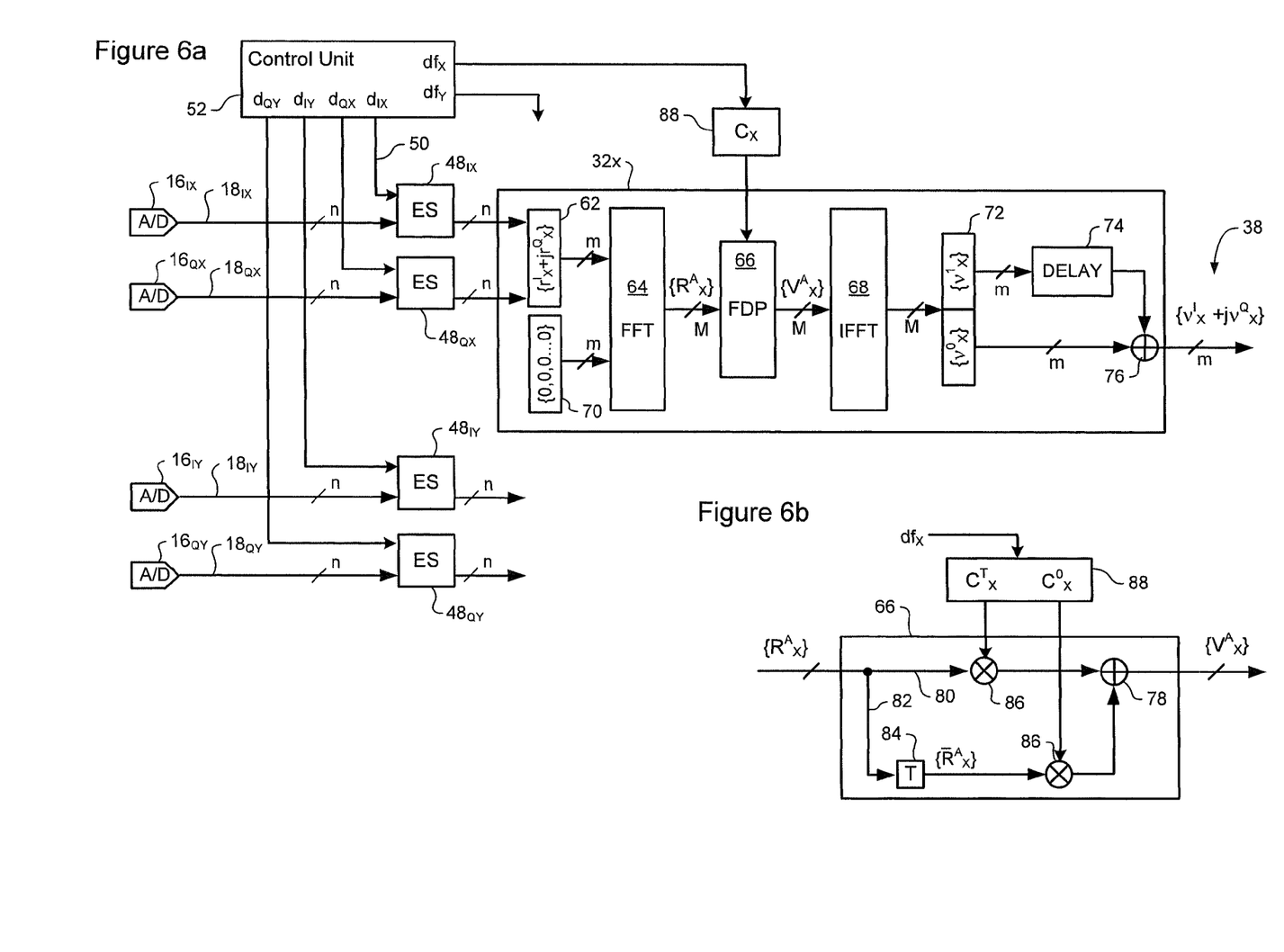
FIGS. 6a and 6b schematically illustrating principal elements and operations of a sample phase error compensation system in accordance with a second embodiment of the present invention.

The elastic stores 48 described above with reference to FIGS. 4 and 5 are capable of correcting sample phase differentials of greater than ½ sample period. However, a residual phase of up to ±½ sample period, may remain. FIG. 6 illustrates an embodiment which overcomes this limitation.

In the embodiment of FIG. 6a, the elastic stores 48 are utilized to provide a "course" alignment stage, which compensates large-scale (i.e. greater than ½ sample period) sample phase differential between each of the raw digital signals 18. Small-scale residual phase differentials of up to ±½ sample period can be compensated by digital signal processing within each dispersion compensator 32, as described below.

As may be seen in FIG. 6a, each dispersion compensator (CD-COMP) 32 is provided as a high speed digital signal processor which is capable of implementing a variety of processing functions. In the illustrated embodiment, two substantially identical CD-COMPs 32 are provided, each of which is connected to receive and process raw In-phase and Quadrature digital signals 18 of a respective received polarization. For simplicity only the X-polarization CD-COMP $32_x$ is illustrated, it being understood that the Y-polarization CD-COMP $32_y$ will be substantially identical.

In the embodiment of FIG. 6a, the CD_COMP 32 generally comprises a pipelined series of functional blocks, including a deserializer 62, a Fast Fourier Transform (FFT) filter 64, a frequency domain processor (FDP) 66 and an Inverse Fast Fourier Transform (IFFT) filter 68.

The deserializer 48 operates to accumulate successive n-bit words of the In-phase and Quadrature digital signals $I_X$ and $Q_X$ from the X-polarization elastic stores 48 during a predetermined clock period. The accumulated n-bit words are then latched into the FFT 64 as a parallel input vector $\{r^I_X + jr^Q_X\}$. Preferably, each of the real and imaginary components of the parallel vector $\{r^I_X + jr^Q_X\}$ have the same resolution (n=5 or 6 bits, for example) as the raw digital signals 18. In general, the width (m), in words, of the input vector $\{r^I_X + jr^Q_X\}$ is selected to be half the width (M) of the FFT $18_X$. In some embodiments, the FFT 64 has a width of M=256 taps, which implies an input vector width of m=128 complex values. However, a different FFT width may be selected, as desired. In practice, the FFT width is selected based on a compromise between circuit size and the amount of dispersion compensation desired.

An advantage of this arrangement is that all of the components downstream of the deserializer 62 operate on a plurality of I,Q samples in parallel. As a result, these components of the CD-COMP 32 can operate at a significantly lower speed than the full line rate of the data path. For example, Nyquist sampling of a 10GBaud optical signal will result in the A/D converters 16 outputting each of the raw I and Q digital signals 18 at a sample rate of about 20GHz.

However, because the deserializer 62 converts this serial stream of n-bit words into blocks of m (=128, for example) parallel complex values (of two words each), the FFT filter 64, FDP 66 and IFFT filter 68 can all operate at a much slower speed, by a factor of m.

The input vector $\{r^I_X + jr^Q_X\}$ is augmented with a null vector $\{0, 0, 0, \ldots 0\}$ 70 which provides a zero data fill to the remaining input taps of the FFT 64.

The FFT filter 64 performs a conventional FFT operation to generate an array $\{R^A_X\}$ representing the frequency domain spectrum of the input vector $\{r^I_X + jr^Q_X\}$. The FDP 66 can then implement any of a variety of frequency domain processing functions, as will be described in greater detail below, to yield a modified array $\{V^A_X\}$, which is supplied to the IFFT filter 68.

The IFFT filter 68 performs a conventional Inverse Fast Fourier Transform operation to yield time domain data 72, in the form of a complex valued vector having a width equal to the IFFT 68, which, in the illustrated embodiment is M taps. In the embodiment of FIG. 6a, the IFFT output data 72 is divided into two blocks $\{v^0_X\}$, and $\{v^1_X\}$, of which $\{v^1_X\}$ is delayed by one clock cycle (at 74) and added to $\{v^0_X\}$ (at 76) to yield the CD-COMP output 38 in the form of a complex valued vector $\{v^I_X + jv^Q_X\}$ encompassing m(=128) complex values.

As is known in the art, conventional FFT and IFFT filters normally implement complex filter functions, which assume that the input I and Q data can properly be treated as real and imaginary components of a single complex valued entity. However, in order to compensate residual sample phase differential in the course-aligned digital signals output from the elastic stores 48, it is necessary for the DSP 32 to implement respective parallel real FFT filter functions for each digital signal 18, rather than a single complex FFT encompassing both I and Q streams. Similarly, respective parallel real IFFT filter functions are required, rather than a signal complex IFFT.

In the illustrated embodiment, this is accomplished by means of a transpose-and-add function within the FDP 66, as may be seen in FIG. 6b. In general, the transpose-and-add function operates to add the FFT output vector $\{R^A_X\}$ to a transposed version of itself $\{\overline{R}_X^A\}$, with respective different compensation vectors. Implementing the transpose and add operation between the complex FFT and IFFT filters has the effect of emulating a pair of parallel real-FFT and IFFT functions through the CD-COMP 32, without requiring the additional of circuits needed for parallel real FFT and IFFT filters. The transpose-and-add function can be conveniently implemented in hardware, by providing a pair of parallel paths between the FFT output and a vector addition block 78. One of these paths may be referred to as a direct path 80, in which the tap-order of the FFT output $\{R^A_X\}$ is retained. The other path, which may be referred to as a transpose path 82, includes a transposition block 84 which operates to reverse the tap-order of the FFT output upstream of the vector addition block 78. In this respect, it will be recognised that the transposition block 84 can be readily implemented in hardware, which provides an advantage in that the transposition step does not incur a significant propagation delay penalty.

Preferably, the direct and transpose paths 80 and 82 are provided with a respective multiplication block 86, which enables various filter functions to be implemented by the FDP 66. For example, in the embodiment of FIG. 6b, a pair of compensation vectors $\{C^O_X\}$ and $\{C^T_X\}$ are applied to the direct and transpose paths, 80 and 82 respectively. Each of the compensation vectors $\{C^O_X\}$ and $\{C^T_X\}$ is composed of a respective set of coefficients which are calculated to apply a desired function, in the frequency-domain, to the digital signals 18. For example, $\{C^O{}_X\}$ and $\{C^T{}_X\}$ may be calculated using a transform of a differential delay function, so as to compensate any residual sample phase errors in the I and Q digital signals. $\{C^O{}_X\}$ and $\{C^T{}_X\}$ may also apply a first-order dispersive function to at least partially compensate chromatic dispersion. When both of these functions are implemented by the compensation vectors $\{C^O{}_X\}$ and $\{C^T{}_X\}$, the CD-COMP output 38 will represent a phase-error corrected and dispersion-compensated version of the raw $I_X$ and $Q_X$ digital signals 18 received from the elastic stores 48.

As may be appreciated, the differential time delay needed to compensate residual sample phase errors may be calculated from the measured propagation delay (or, alternatively, the delay differences) between the beam splitter 4 and the output of each A/D converter 16, and the control words 50 used to set the delays imposed by each elastic store 48. The resulting differential time delay parameters $df_X$ and $df_Y$ can then be passed to a co-efficient calculation block 88 for calculating the compensation vectors $\{C^O{}_X\}$ and $\{C^T{}_X\}$ of each CD-COMP 32. With this arrangement, residual quadrature error, and even residual sample phase delay differences between the X-polarization and Y-Polarization digital signals can be compensated, even though these streams are processed through respective independent CD-COMPs 32.

Figure 7:
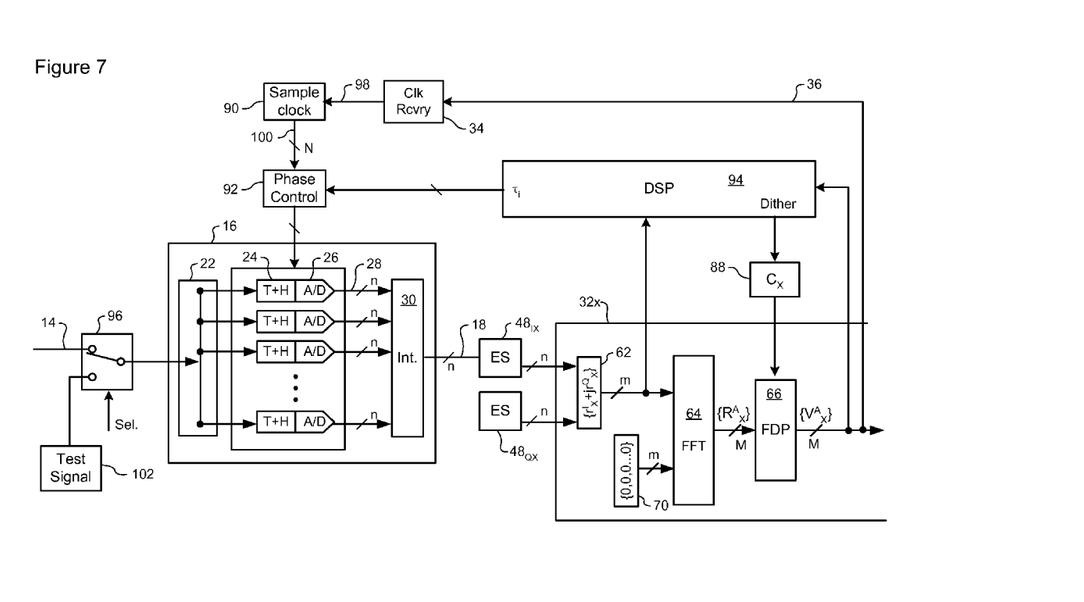
FIG. 7 is a block diagram schematically illustrating principal elements and operations of a timing error compensation system for compensating timing errors within a high-speed A/D converter of the type illustrated in FIG. 2.
Figure 8:
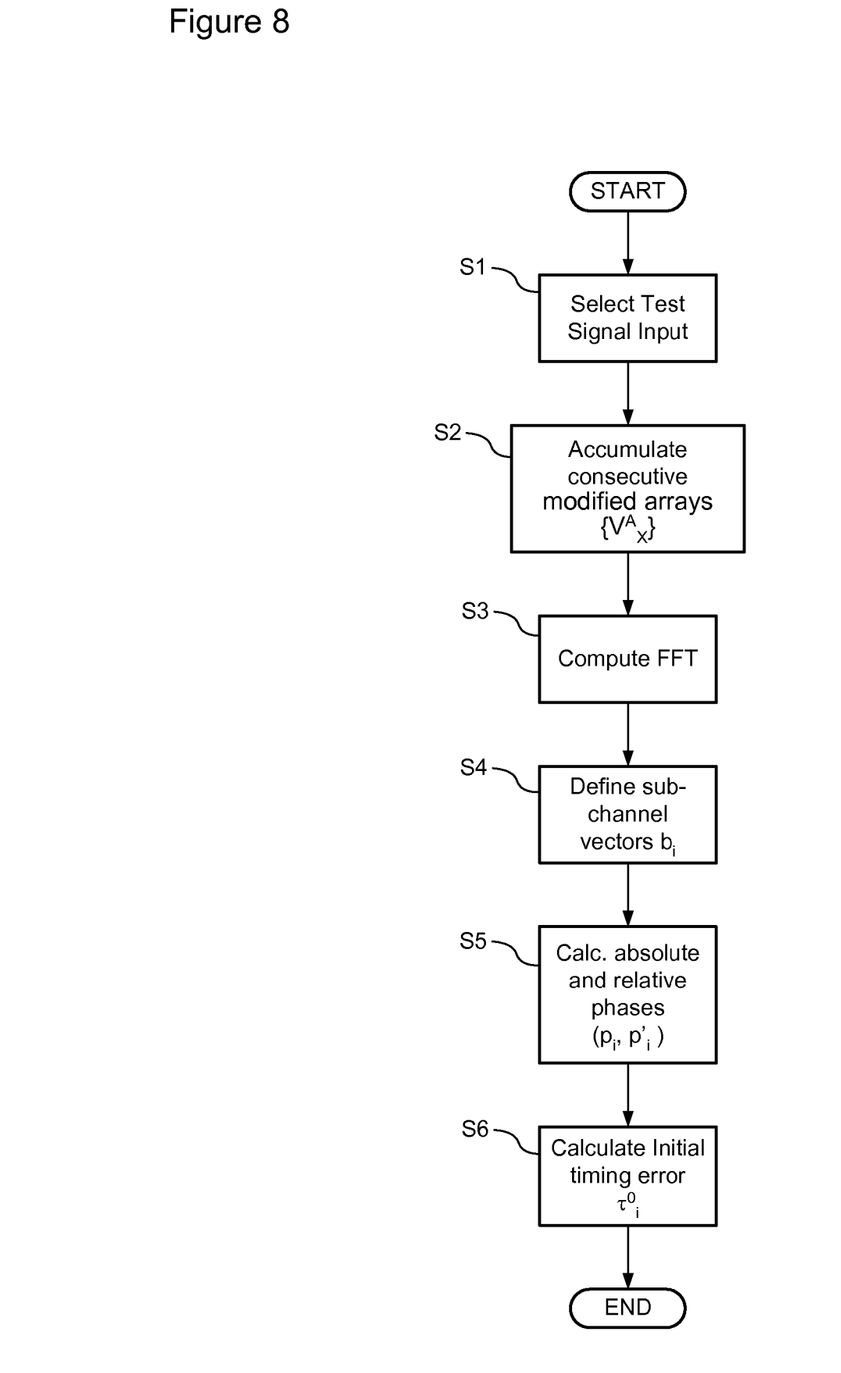
FIG. 8 is a flowchart illustrating principal steps in a method of calculating initial timing error estimates usable in the timing error compensation system of FIG. 7.
Figure 9:
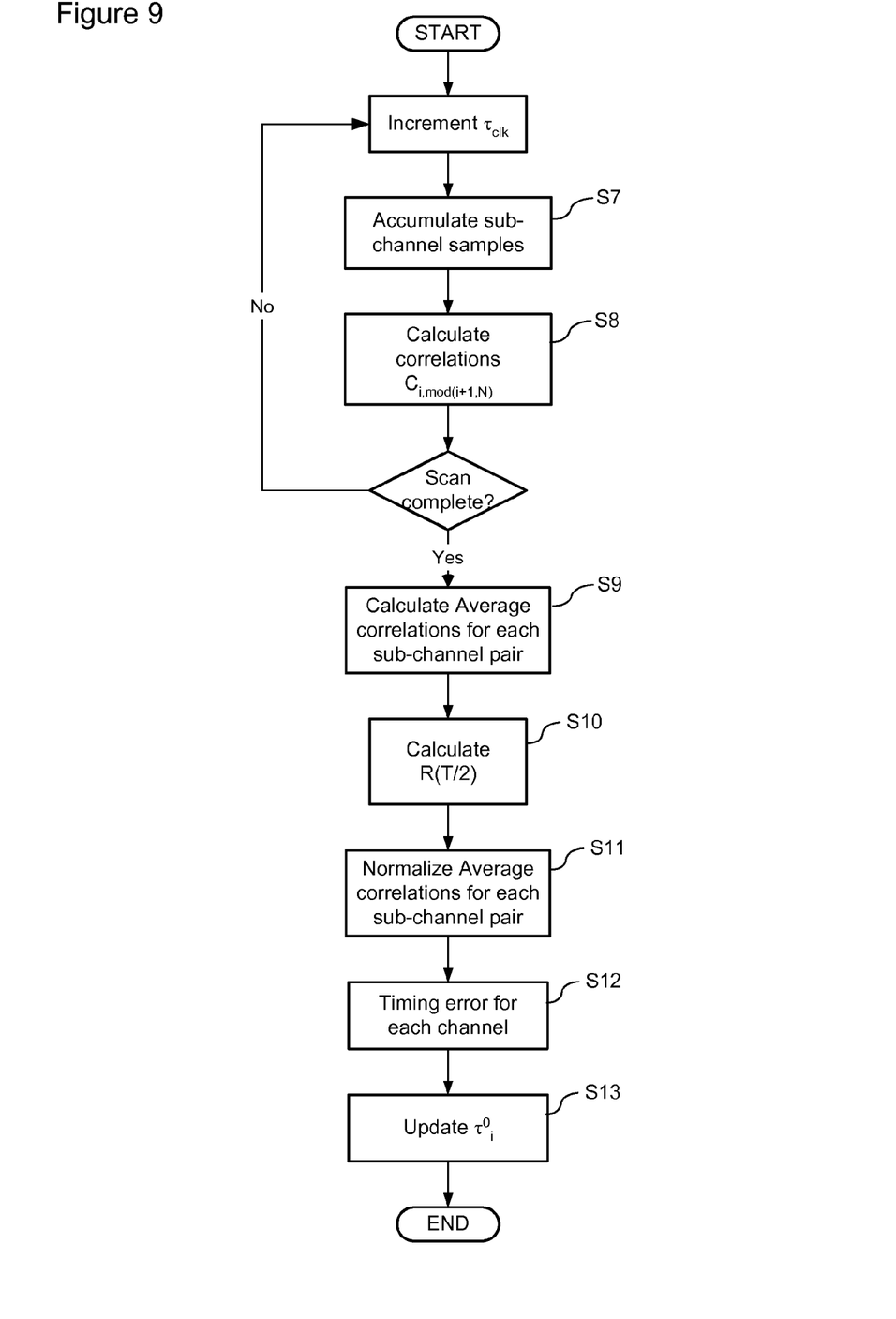
FIG. 9 is a flowchart illustrating principal steps in a method of calculating updated timing error estimates during steady-state run-time, usable in the timing error compensation system of FIG. 7.

The embodiments described above with reference to FIGS. 3-6 address phase differential between each of the raw digital signals 18 generated by the A/D converters 16. A second aspect of the present invention provides systems and techniques for minimizing effects of sample timing error between sub-channels of a multi-channel A/D converter. FIGS. 7-9 illustrate a representative sample timing control loop for accomplishing this result.

As may be seen in FIG. 7, the timing control loop generally comprises an interleaved sample clock generator 90; a phase control block 92; digital signal processor (DSP) 94; and a switch block 96 for selectively supplying a test signal to the A/D converter 16 input. The components of the multi-channel A/D converter 16 may be substantially identical to those described above with reference to FIG. 2.

The interleaved sample clock generator 90 receives a master clock signal 98 from the clock recovery circuit 34, and generates a respective sample clock signal 100 for each sub-channel A/D converter 26. For example, consider a receiver which implements Nyquist sampling, and the A/D converter is composed of N=16 sub-channel A/Ds 26. In this case, the interleaved sample clock generator 90 will generate N=16 sample clock signals 100 spaced apart (in time) by T/2, where T is the symbol period. Each sample clock signal will have a period of N×T/2=8T.

The phase control block 92 operates to adjust the phase of each sample clock signal 100 to compensate sample timing errors of each sub-channel A/D 26, due, for example, to manufacturing variations, temperature, and component aging. This sample clock phase adjustment is based on a respective timing error estimate $\tau_i$ (0≤i≤N), which is calculated by the digital signal processor 94, as will be described in greater detail below.

The switch block 96 operates in a conventional manner (for example in response to a suitable control signal) to selectively supply the photodetector current 14 or a test signal 102 to the A/D converter 16 input. The test signal 102 can be any suitable analog signal waveform having known signal characteristics. In some embodiments, a sinusoidal test signal is used, although this is not essential. If desired, the test signal may be generated by an external signal generator of a type well known in the art, and supplied to the receiver through a suitable analog signal input port (not shown). In such cases, the test signal 102 may also be used as the control signal for controlling the switch block 96, since the presence of the test signal 102 at the input port will also indicate that the test signal 102 is to be supplied to the input of the A/D converter 16. This arrangement is advantageous in that it enables well known "bench-top" waveform generators to be used to supply the test signal 102, and so avoids the cost of including a waveform generator "on-chip" within the receiver, although that later option may also be used, if desired.

As mentioned above, the DSP 94 operates to compute respective a timing error estimate $\tau_i$ (0≤i≤N) for each sub-channel A/D 26. In the embodiment of FIG. 7, this operation is based on two observations that: the time averaged sample clock period for all of the sub-channel sample clock signals 100 is exactly N*T/2 (assuming Nyquist sampling); and, in the absence if timing error, the average autocorrelation between any pair of adjacent sub-channel digital signals, taken over all possible sample clock phases, will be equal to the autocorrelation value calculated for a sample time offset of T/2 (again, assuming Nyquist sampling). The first of these observations implies that the N*T/2 distance is a measure of sampling rate of the A/D converter 16, and is only a function of the overall clock recovery circuit. In effect, this decouples the timing control loop from the clock recovery loop. The second observation provides a metric by which the timing error $\tau_i$ of each sub-channel can be estimated during steady-state run-time operation of the receiver.

FIG. 8 is a flow chart illustrating principle steps in an algorithm for calibrating the A/D converter to compute initial estimates $\tau^0{}_i$ of the timing error. This calibration step may suitably be performed during factory test, in which case the initial timing error estimates $\tau^0{}_i$ can be stored in a non-volatile memory, for use during start-up of the receiver. Once the receiver has entered a steady-state operating mode, it is preferable to calculate updated timing error estimates $\tau_i$ to compensate performance variations due to temperature.

Referring to FIG. 8, for A/D converter calibration, the test signal 102 is supplied to the A/D converter 16 input (step S1), and a pair of consecutive modified arrays $\{V^A{}_X\}$ appearing at the output of the FDP 66 are tapped and stored (at step S2) by the DSP 94. An M-point Fast Fourier Transform (FFT) is then computed (step S3) as follows:

$$R_n^M(k) = R_n(k) + (-1)^k R_{n+1}^M(k), (0 \leq k \leq M-1)$$

The position x of the maximum value, $R_n^M(x) = \text{Max}(R_n^M(K))$, is then found, and a respective vector $b_i$ for each sub-channel defined (step S4) as:

$$b_i = R_n^M(\text{mod}[x-16i, M]), (0 \leq i \leq N-1)$$

An N-point Inverse Fourier Transform (IFFT is then performed on each vector $b_i$ (step S5), and vector, the absolute phase of each sub-channel can be found from:

$$p_i = \text{Arg}[\text{IFFT}(b_i)]$$

The Relative Phase of each sub-channel, referenced to Sub-channel i=0, can be found from:

$$p'_i = \arctan\left[\frac{\sin(p_i - p_0)}{\cos(p_i - p_0)}\right]$$

The initial timing estimate $\tau^0{}_i$ for each sub-channel (step S6), can then be found from $$\tau_i^0 = \frac{p_i' f_s}{2\pi f_{in}},$$

where $f_s$ is the sample frequency and $f_{in}$ is the test signal frequency.

As noted above, the initial timing estimate $\tau^0_i$ for each sub-channel can be stored in non-volatile memory for use during start-up. In addition, if, for any reason, the receiver must execute a reset and reacquire signal, these initial values can also be used. However, because the sub-channel A/D performance can vary with temperature, it is preferable to implement an adaptive control loop to compute updated timing estimates $\tau_i$ during run-time. Preferably, this function should be performed without interrupting subscriber data traffic through the receiver, which precludes utilizing a test signal 102 as in the above-descried calibration procedure.

However, real signals can have various amounts of correlation or anticorrelation built into the signals, depending upon variables such as the data pattern, the master clock phase, the amount of dispersion, polarization effects and additive noise. If one treats the data pattern as random, then the signal can be approximated as a cyclostationary signal, removing the data pattern from the average results. The main problem remaining is that the master clock phase can have a large effect upon correlations, and the amount of the effect depends upon the other variables of the optical signal. This creates confusing results.

FIG. 9 is a flow chart illustrating principle steps in a method for computing updated timing estimates $\tau_i$ during steady-state run-time operation of the receiver. In this mode of operation, it is preferable to scan the sample phase through an entire symbol period, T, so as to obtain input data at a distribution of sample phases. Advantageously, this distribution is uniform across a symbol interval. In effect, this allows the entire eye opening to be explored and analysed, thereby ensuring the best possible estimate of the average correlation value, eliminating the effect of master clock phase.

As may be appreciated, various methods may be used to scan or randomize the sample phase. In the illustrated embodiments, this is accomplished by applying a dither to the compensation vectors $\{C^O_X\}$ and $\{C^T_X\}$, which operates to apply an incremental phase shift to the modified array $\{V^A_X\}$ appearing at the output of the FDP 66. Preferably, each increment, and the rate at which successive increments are applied, are selected to be small enough to avoid destabilizing downstream adaptive control loops for polarization compensation or clock recovery, for example. In some embodiments, the dither is designed to scan one symbol period T in 100 increments (of 0.01*T each), over a scanning period of 10 seconds.

In the coherent optical receiver of FIGS. 3-7, the clock recovery circuit 34 operates on the basis of signals 36 tapped downstream of the FDP 66; either at the FDP 66 output itself, or at the output of the Polarization compensator 40, as described in Applicant's co-pending U.S. patent applications Nos. 11/315,342 and 11/315,345. As a result, imposing a very low frequency phase shift on the modified array $\{V^A_X\}$ appearing at the output of the FDP 66 has the effect of shifting the phase of the recovered clock signal, but without causing a loss of phase/frequency lock of the clock recovery circuit 34. This recovered clock is the master clock for the A/Ds.

By continuously applying the above-described dither signal to the compensation vectors $\{C^O_X\}$ and $\{C^T_X\}$, the sample phase will continuously scan the eye opening of the input optical signal. At each sample timing (phase) increment $\tau_{clk}$, each sub-channel signal 28 is tapped (step S7) to capture a respective sequence of sub-channel samples $X_i(a)$, $(0 \leq a \leq b)$. In the illustrated embodiment, this is accomplished by tapping the FFT input vector $\{r^I_X + jr^Q_X\}$, and then isolating samples of each sub-channel from there. However, an alternative method would be to tap each sub-channel signal 28 directly. In either case, a predetermined number (e.g. b=24) of samples are captured, for each sub-channel, during every sample phase increment $\tau_{clk}$. Following the above example, this implies 100 data captures (of 24 samples for each of the N sub-channels) during each scan of the eye opening.

For each data capture, the obtained samples are analysed to determine a correlation with an adjacent sub-channel (step S8), as follows:

$$C_{i,mod(i+1,N)}[\tau_{clk}] = \sum_s X_i(s) \cdot X_{mod(i+1,N)}(s)$$

For the case of a 16 sub-channel A/D converter, this general formula appears as:

$$C_{0,1}[\tau_{clk}] = \sum_s X_0(s) \cdot S_1(s)$$

$$C_{1,2}[\tau_{clk}] = \sum_s X_1(s) \cdot S_2(s)$$

$$C_{2,3}[\tau_{clk}] = \sum_s X_2(s) \cdot S_3(s)$$

$$\vdots$$

$$C_{15,0}[\tau_{clk}] = \sum_s X_{15}(s) \cdot S'_0(s)$$

Where $X_i(s)$ represents each captured value of the $i^{th}$ sub-channel at the sample phase $\tau_{clk}$, and $X'_0(s)$ is $X_0(s)$ delayed by 1 sample.

At the end of each scan cycle (or, equivalently, at the end of every 100 captures in the above example) a respective average correlation value, $$R_{i,mod(i+1,N)} = \sum_{\tau_{clk}} C_{i,mod(i+1,N)}[\tau_{clk}],$$

across all sample phases, is calculated for each sub-channel pair (step S9). The signal autocorrelation value R(T/2), at an offset of T/2, is then calculated (step S10) by averaging across all of the sub-channels. Normalized correlations $R'_{i,mod(i+1,N)}$ for each sub-channel pair can then be determined (step S11) by subtracting the signal autocorrelation value R(T/2) from each of the respective average correlation values $R'_{i,mod(i+1,N)}$.

The resulting normalized correlations (e.g. $R'_{0,1}$, $R'_{1,2}$, $R'_{2,3}$ ...) are linearly proportional to the relative timing error between the involved sub-channels. In order to translate these values into absolute timing errors, we assume that channel i=0 is ideally sampled, and recognise that the distance between successive samples is N*T/2. In the case of a 16 sub-channel A/D converter, that calculation can be done as follows (step S12):

$e_0 = 0$ (by definition)
$e_1 = R'_{0,1} - R'_{1,2} - R'_{2,3} \ldots - R'_{13,14} - R'_{14,15} - R'_{15,0}$
$e_2 = R'_{0,1} - R'_{1,2} - R'_{2,3} \ldots - R'_{13,14} - R'_{14,15} - R'_{15,0}$
$e_3 = R'_{0,1} - R'_{1,2} - R'_{2,3} - R'_{13,14} - R'_{14,15} - R'_{15,0}$
$\vdots$
$e_{14} = R'_{0,1} - R'_{1,2} - R'_{2,3} \ldots - R'_{13,14} - R'_{14,15} - R'_{15,0}$
$e_{15} = R'_{0,1} - R'_{1,2} - R'_{2,3} \ldots - R'_{13,14} - R'_{14,15} - R'_{15,0}$ These errors $e_0 \ldots e_{15}$ an then be used to update the initial timing estimate $\tau^0_i$ (step S13) calculated during the calibration step described above with reference to FIGS. 7 and 8.

In the foregoing description, the sample phase is scanned continuously by applying a dither signal to the compensation vectors {C0X} and {CTX}. For low-to-moderate levels of dispersion (i.e. below about 20,000 ps/nm, for example) this scanning process yields a significant improvement in accuracy. For higher amounts of dispersion, however the effect is less distinct, because severe signal dispersion has an averaging effect on signal powers, and thus the correlation values that are calculated. Furthermore, compensation of increasingly severe dispersion leaves less headroom in the FDP 66 for implementing the desired incremental phase shifts. Accordingly, for optical signals with severe dispersion, the sample phase scan operation can be omitted, in favour of performing data capture at the same rate but with a fixed sample phase; that is, without applying the dither signal to the compensation vectors {C0X} and {CTX}. All other steps in the above described process are then executed without further changes, to obtain the updated timing estimates τi for each sub-channel.

If, for example, the timing of two multibit samples are to be controlled to occur at a nominal n*50 ps separation between sampling times, then the deviation from that nominal separation is the phase differential of the two samples. Actual hardware has finite sampling windows, clock jitter, and other circuit effects, so one may use approximations such as the effective average sample times rather than unrealizable mathematical ideals.

Linear, or nonlinear, feedback control loops can be used instead of or in addition to feed-forward phase compensation methods.

In the embodiments described above, the sample phase error is estimated and used to control the sample timing of each A/D converter. However, other metrics can be used, if desired. A desirable characteristic of such a metric for a feedback control method is to provide, on average, a reasonably correct average sign of the error. This allows a zero-forcing loop to obtain reasonable results. A one bit estimate of the error is an example of this kind of metric. On the other hand, a metric substantially proportional to the error allows a linear feedback loop, for example a multibit estimate of the error.

As may be appreciated, when the metric is a more precisely known, or calibrated, function of the error, then feed-forward compensation can be used.

If the metric does not provide the sign of the error, then single dimensional or multidimensional stepping methods can be used for minimization or maximization, as described in Applicant's co-pending U.S. patent application Ser. No. 09/956,557, filed Sep. 20, 2001. This stepping to hunt for a local minimum is distinct from the above-described dither that removes cyclostationary correlation effects. Signal bit error rate and estimated mean squared error are examples of metrics, to be minimized, that do not directly provide the sign of the error.

The metric is preferably digital, but an analog metric can be used with appropriate analog control circuitry.

The examples described above are of coherent optical receivers. However, the methods of the present invention are also applicable to other types of optical receivers that utilize multibit-digital signals, such as incoherent, direct detection, frequency detection, or differential phase receivers. These methods are especially advantageous for high speed receivers with multi-bit digital processing or equalization.

The embodiments of the invention described above are intended to be illustrative only. The scope of the invention is therefore intended to be limited solely by the scope of the appended claims.

We claim:

1. In an optical receiver, a method of compensating sample phase error between parallel multi-bit-digital signals of a received optical signal, the method comprising steps of:
   identifying a first digital signal having a greatest amount of propagation delay;
   determining a respective sample phase differential between the first digital signal and a second digital signal;
   imposing a digital skew between the digital signals, an amount of skew imposed being an integer number of sample periods calculated to most nearly compensate the sample phase differential; and
   digitally processing the skewed digital signals, in the frequency domain, to compensate a residual portion of the sample phase differential.

2. A method as claimed in claim 1, wherein the step of imposing a digital skew comprises a step of delaying the second digital signal by the calculated number of sample periods, relative the first digital signal.

3. A method as claimed in claim 1, wherein the step of digitally processing the skewed digital signals comprises steps of:
   computing an array $\{R^A_X\}$ representative of a spectrum of the received optical signal, based on at least one of the digital signals;
   applying a selected frequency domain function to the array $\{R^A_X\}$ to derive a modified array $\{V^A_X\}$;
   deriving a time-domain output vector based on the modified array $\{V^A_X\}$; and
   wherein the frequency domain function imposes a phase delay that compensates the residual portion of the phase differential.

4. A method as claimed in claim 3, wherein the first and second digital signals correspond to respective In-phase and Quadrature components of a received polarization of the optical signal, and wherein the array $\{R^A_X\}$ representative of a spectrum of the received optical signal is computed based on both the first and second digital signals taken together.

5. A method as claimed in claim 3, wherein the first and second digital signals are derived from respective different received polarizations of the optical signal, and wherein the array $\{R^A_X\}$ representative of a spectrum of the received optical signal is computed based on a selected one of the first and second digital signals, and a third digital signal derived from the same received polarization as the selected digital signal.

6. A method as claimed in claim 3, wherein the step of applying the frequency domain function to the array $\{R^A_{X}\}$ comprises a step of multiplying the array $\{R^A_{X}\}$ by a coefficient vector implementing the frequency domain function.

7. A method as claimed in claim 3, wherein the step of applying the frequency domain function to the array $\{R^A_{X}\}$ comprises steps of:

multiplying the array $\{R^A_{X}\}$ and a transpose array $\{\overline{R}_X^A\}$ by a respective coefficient vector implementing the frequency domain function; and adding the multiplication results.

* * * * *